United States Patent
Chou

(10) Patent No.: US 7,751,858 B2
(45) Date of Patent: Jul. 6, 2010

(54) SLEEP-MODE STATISTICS APPARATUS, SYSTEMS, AND METHODS

(75) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 868 days.

(21) Appl. No.: 11/381,898

(22) Filed: May 5, 2006

(65) Prior Publication Data

US 2007/0274247 A1 Nov. 29, 2007

(51) Int. Cl.
*H04B 1/38* (2006.01)
*H04B 1/16* (2006.01)
(52) U.S. Cl. .................. 455/574; 455/343.1; 455/343.2
(58) Field of Classification Search ................ 455/574, 455/343.1, 343.2, 343.5, 517, 423; 370/311, 370/310
See application file for complete search history.

(56) References Cited

U.S. PATENT DOCUMENTS

| | | | | |
|---|---|---|---|---|
| 5,128,938 A | * | 7/1992 | Borras | 370/311 |
| 5,574,996 A | | 11/1996 | Raith | |
| 5,991,635 A | * | 11/1999 | Dent et al. | 455/517 |
| 6,119,024 A | * | 9/2000 | Takayama | 455/574 |
| 6,223,047 B1 | | 4/2001 | Ericsson | |
| 6,285,875 B1 | * | 9/2001 | Alajoki et al. | 455/423 |
| 6,560,453 B1 | * | 5/2003 | Henry et al. | 455/67.11 |
| 6,975,869 B1 | * | 12/2005 | Billon | 455/452.1 |
| 7,130,668 B2 | * | 10/2006 | Chang et al. | 455/574 |
| 7,408,887 B2 | * | 8/2008 | Sengupta et al. | 370/252 |
| 7,486,696 B2 | * | 2/2009 | Garg et al. | 370/468 |
| 2004/0218556 A1 | * | 11/2004 | Son et al. | 370/311 |
| 2006/0126554 A1 | * | 6/2006 | Motegi et al. | 370/328 |
| 2006/0203766 A1 | * | 9/2006 | Kim et al. | 370/328 |
| 2006/0294214 A1 | | 12/2006 | Chou | |
| 2008/0009328 A1 | * | 1/2008 | Narasimha | 455/574 |

OTHER PUBLICATIONS

"IEEE Standard 802.11g™ —IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 4: Further Higher Data Rate Extension in the 2.4 GHz Band", *IEEE Std. 802.11g™ 2003*, The Institute of Electical and Electronics Engineers, Inc. NY, (2003), 78 pgs.

"IEEE Standard 802.16™ —IEEE Standard for Local and Metropolitan Area Networks—Part 16: Air Interface for Fixed Broadband Wireless Access Systems", *IEEE Std. 802.16™ —2004 (Revision of IEEE Std. 802.16-2001)*, The Institute of Electrical and Electronics Engineers, Inc., NY, (2001), 895 pgs.

(Continued)

*Primary Examiner*—Sonny Trinh
(74) *Attorney, Agent, or Firm*—Schwegman, Lundberg & Woessner, P.A.

(57) ABSTRACT

Embodiments of sleep-mode statistics apparatus, systems, and methods are described generally herein. Other embodiments may be described and claimed.

22 Claims, 4 Drawing Sheets

OTHER PUBLICATIONS

"IEEE Standard 802.16™ Conformance, IEEE Standard for Conformance to IEEE 802.16, Part 1: Protocol Implementation Conformance Statement (PICS) Proforma for 10-66 GHz WirelessMan-SC™ Air Interface", *IEEE Std 802.16™/Conformance01-2003*, The Institute of Electical and Electronics Engineers, Inc., New York, NY, (2003), 148 pgs.

"IEEE Standard 802.11e™ —IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 8: Medium Access Control (MAC) Quality of Service Enhancements", *IEEE Std 802.11e tm—2005*, IEEE, New York, NY, (Nov. 11, 2005), 211 pgs.

"IEEE Standard 802.16a™ —IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz", *IEEE Std. 802.16a™ —2003*, The Institute of Electrical and Electronics Engineers, Inc., New York, NY, (2003), 318 pgs.

"IEEE Standard 802.16 e™—IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1", *IEEE Std. 802.16e™-2005 and IEEE Std. 802.16™-2004/Cor1-2005 (Amendment and Corrigendum to IEEE 802.16-2004)*, The Institute of Electrical and Electronics Engineers, Inc., New York, NY, (2006), 864 pgs.

"IEEE Standard 802.16f™ —IEEE Standard for Local and Metropolitan Area Networks, Part 16: Air Interface for Fixed Broadband Wireless Access Systems—Amendment 1: Management Information Base", *IEEE Std. 802.16f™-2005*, IEEE, New York, NY, (2005), 257 pgs.

"IEEE Standards for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 2: Higher-Speed Physical Layer (PHY) Extension in the 2.4 GHz Band—Corrigendum 1", *IEEE Std. 802.11b-1999/Cor. 1-2001*, The Institute of Electrical and Electronics Engineers, Inc., New York, NY, (1999), 24 pgs.

"Information Technology—Telecommunications and Information Exchange Between Systems—Local and Metropolitan Area Networks—Specific Requirements—Part 11: Wireless LAN Medium Access Control (MAC) and Physical Layer (PHY) Specifications", *ANSI/IEEE Std. 802.11, 1999 Edition (R2003)*, The Institute of Electrical and Electronics Engineers, Inc., New York, NY, (2003), 528 pgs.

"Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher Speed Physical Layer Extension in the 2.4 GHz Band", *IEEE Std. 802.11b-1999 (R2003)*, The Institute of Electrical and Electronics Engineers, Inc., New York, NY, (1999), 96 pgs.

"Supplement to IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications; High-Speed Physical Layer in the 5GHz Band", *IEEE Std. 802.11a-1999*, IEEE Computer Society, New York, NY,(1999, reaffirmed Jun. 12, 2003), 91 pgs.

Chou, J. , "Event Logging Techniques for Broadband Wireless Access Networks", U.S. Appl. No. 11/166,526, filed Jun. 22, 2005.

Chou, J. , "System and Method for Communicating With Fixed and Mobile Subscriber Stations", U.S. Appl. No. 11/222,675, filed Sep. 9, 2005.

"PCT Application No. PCT/US2007/068121, International Search Report mailed Sep. 18, 2007", 3 pgs.

"PCT Application No. PCT/US2007/068121, Written Opinion Sep. 18, 2007", 5 pgs.

* cited by examiner

SLEEP-MODE STATISTICS APPARATUS, SYSTEMS, AND METHODS

TECHNICAL FIELD

Various embodiments described herein relate to electronic communications generally, including apparatus, systems, and methods associated with wireless networks.

BACKGROUND INFORMATION

A sleep mode of operation has been important to a successful deployment of modern wireless mobile devices. Sleep mode is a state wherein a mobile station (MS) refrains from communicating with a base station (BS) for a pre-negotiated period. During the sleep period, the MS may be generally unavailable to receive communications from the BS. Sleep mode may minimize MS power usage and conserve spectral resources.

When the MS is in the sleep-mode state, the BS may buffer or drop media access control (MAC) service data units (SDUs) addressed to a unicast connection bound to the MS. The BS may choose to delay a transmission of SDUs addressed to a multicast connection until an occurrence of an availability interval common to all MSs participating in the multicast connection.

A BS may maintain one or more contexts for each MS registered at the BS. Each context may comprise connection parameters related to a power-saving class. The power-saving class may comprise a group of connections with common quality-of-service demand properties. For example, in an Institute of Electrical and Electronics Engineers (IEEE) 802.16e™ network, all best-effort service (BE) and non-real-time variable rate service (NRT-VR) connections may be marked as belonging to a single class. Additional information regarding the IEEE 802.16e™ protocol standard may be found in 802.16e™; IEEE Standard for Local and Metropolitan Area Networks—Part 16; Air Interface for Fixed and Mobile Broadband Wireless Access Systems—Amendment 2; Physical and Medium Access Control Layers for Combined Fixed and Mobile Operation in Licensed Bands (published Feb. 28, 2006). Two unsolicited grant service (UGS) connections may belong to two different classes, in case the latter have different intervals between subsequent allocations. A power-saving class may be repeatedly activated and deactivated. Activation in this regard means starting sleep and listening window sequences associated with a class.

Three types of power-saving classes are defined in 802.16e™. They differ according to parameter sets, procedures for activation and deactivation, and policies to determine MS availability for data transmission. Power Saving Class type I is recommended for connections of a BE and an NRT-VR type. Power Saving Class type II is recommended for connections of a UGS and an RT-VR type. Power Saving Class type III is recommended for multicast connections and for management operations.

A challenge of sleep-mode operation is how to maximize sleep-mode intervals without degrading a quality and performance required by real-time services. Efforts having included fine tuning power-saving mechanisms, including methods of dynamic adaptation to a variety of traffic patterns and user behavior.

DETAILED DESCRIPTION

Figure 1:
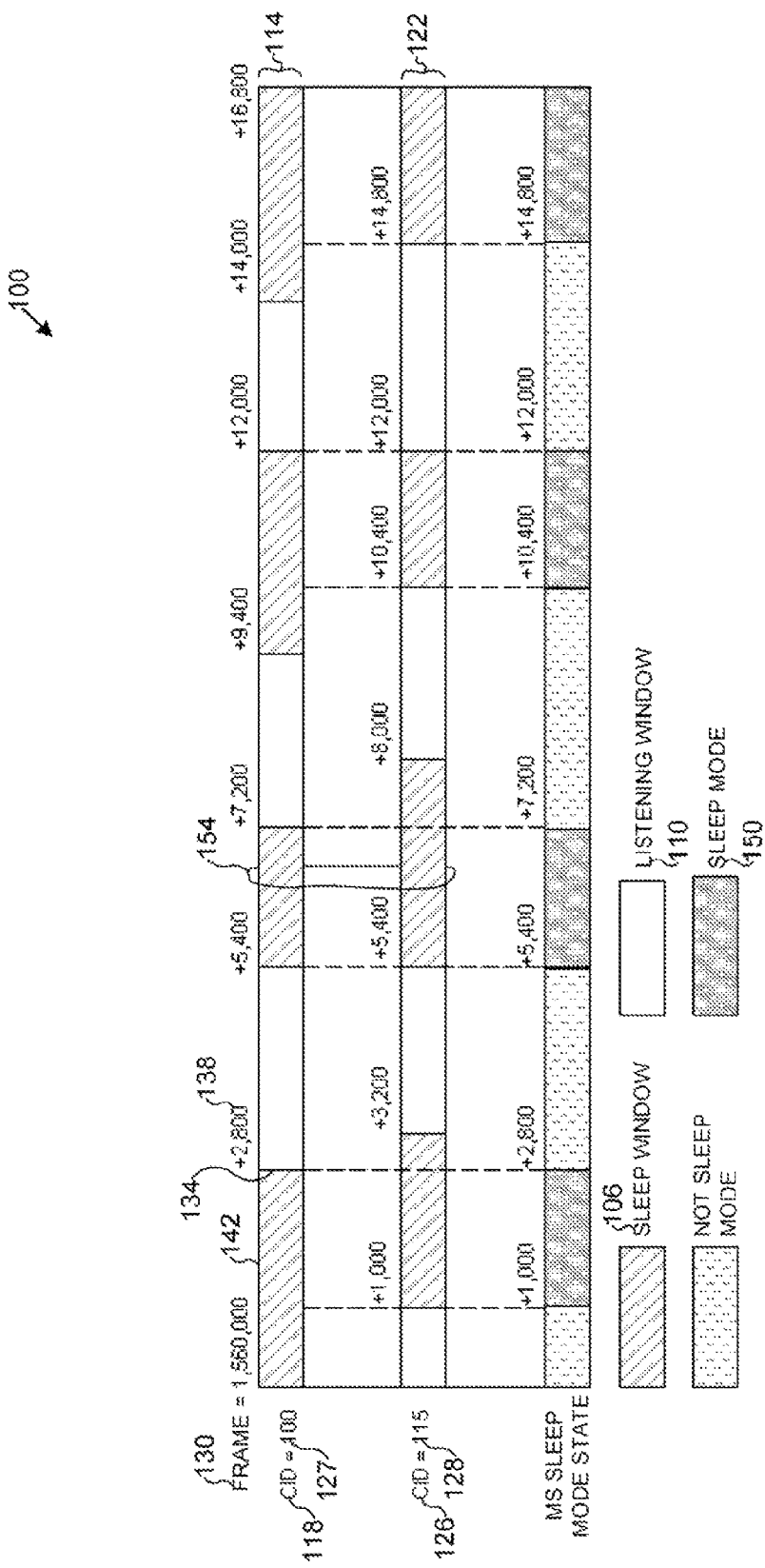
FIG. 1 is a sleep window timing diagram according to various embodiments.

FIG. 1 comprises a sleep window timing diagram 100 according to various embodiments herein. The sleep window timing diagram 100 shows sleep windows 106 and listening windows 110 associated with an MS associated to a BS. A first sequence of sleep and listening windows 114 may be associated with an active connection 118. A second sequence of sleep and listening windows 122 may be associated with an active connection 126. The active connections 118 and 126 may be identified by connection identifiers (CIDs) 127 and 128, respectively. The active connections 118 and 126 may be associated with data streams traveling between the MS and services being accessed by the MS.

A data stream transmitted on a wireless system air interface may be divided into frames. A duration of a frame may be defined in a frame duration code for IEEE 802.16e™ networks, and may range from 2.0 milliseconds (ms) to 20.0 ms. Systems of other embodiments may use different frame duration values. The frame duration may be fixed for all MSs associated to a particular BS. Each uplink (UL) and downlink (DL) frame is assigned a frame number 130. A physical-layer (PHY) synchronization field in a downlink map (DL-MAP) message imbedded in the frame may contain the frame number 130. The frame number 130 may be incremented by 1 MOD 2^24 for each new frame.

The window timing diagram 100 thus depicts a snapshot in time of a sequence of sleep and listening windows associated with each of the connections 118 and 126. An example boundary 134 between an end of a sleep window and a start of a next listening window is marked with an offset frame count 138. The offset frame count 138 represents an offset from a start of a first (leftmost) sleep window 142. The offset frame count 138 multiplied by the frame duration yields the offset in seconds.

It is noted that an existence of a sleep window associated with a particular CID at a particular point in time is necessary but not sufficient to conclude that the MS is in a sleep mode 150. To conclude that the MS is in the sleep mode 150 at a particular time (e.g., a time corresponding to a packet offset equal to +6,500), sleep windows associated with all CIDs currently active with the MS at the particular time (e.g., sleep windows 154) must overlap in a time dimension.

Figure 2:
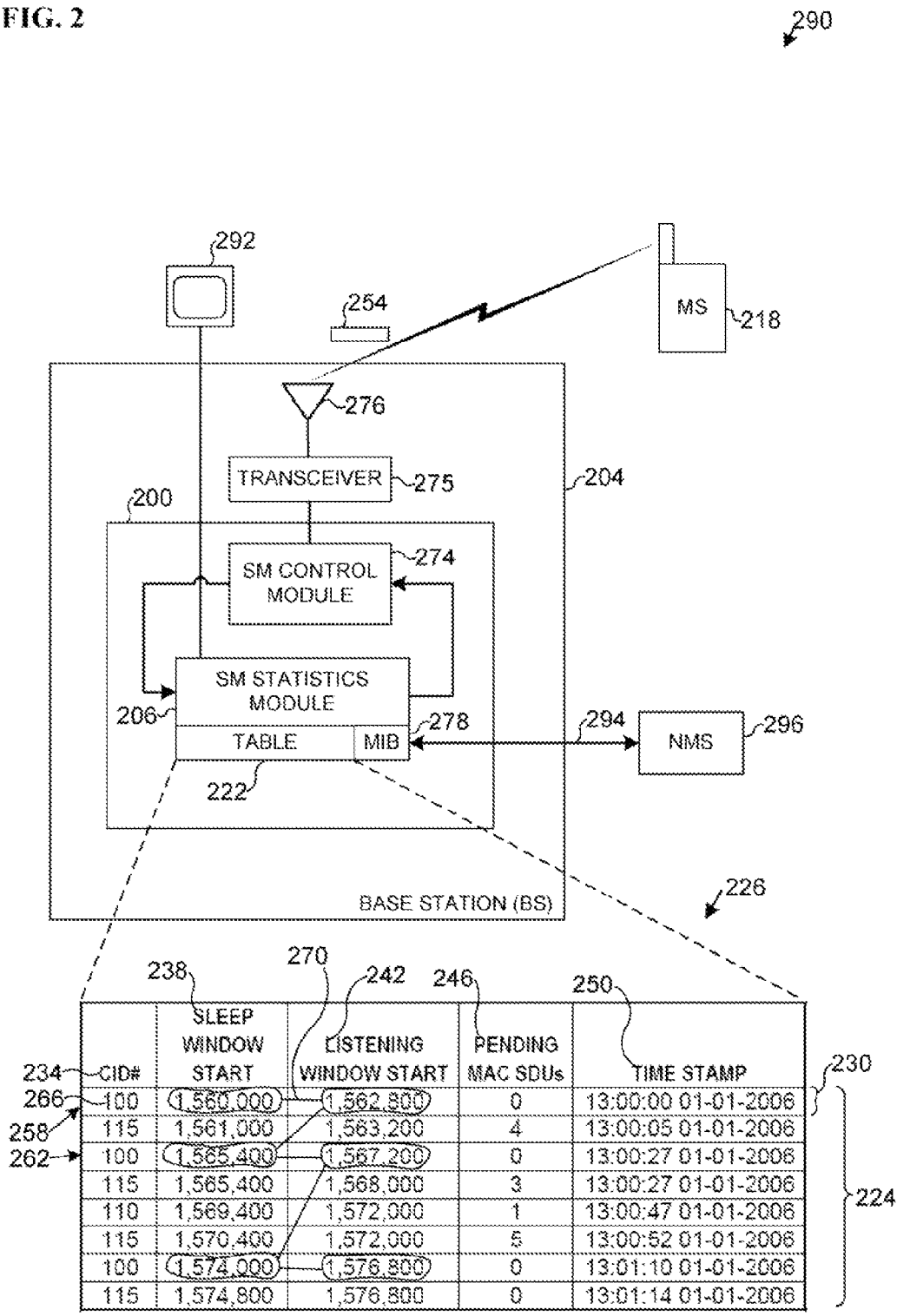
FIG. 2 is a block diagram of an apparatus and a representative system according to various embodiments.

FIG. 2 comprises an apparatus 200 and a representative system 290 according to various embodiments. Embodiments herein may capture sleep-mode statistics. The statistics may be used by a power-saving mechanism to decrease power consumption for MSs associated with the wireless BS 204 utilizing the embodiments. The statistics may also be used by carriers or vendors for performance monitoring and debugging of the power-saving mechanism.

The apparatus 200 may include a sleep-mode (SM) statistics module 206. The SM statistics module 206 may be located at the wireless BS 204. The SM statistics module 206 may capture and store a plurality of SM statistics. The plurality of SM statistics may include SM statistics associated with an MS 218 in communication with the BS 204.

The apparatus 200 may also include a memory to contain a data structure associated with the SM statistics module. The data structure may comprise a table, an array, or a list, among other data structure organizational types. The data structure may be referred to hereinafter for clarity as a table 222. The plurality of SM statistics may be stored in the table 222. The table 222 may be segmented according to a plurality of geographical sectors served by the BS 204. The table 222 may be further segmented to store a plurality of records 224 in a table subset 226 associated with the MS 218 as the MS 218 roams in a particular geographical sector.

An example record 230 associated with the table subset 226 may comprise a CID 234. The CID 234 may identify a connection to the MS 218, as previously described. The record 230 may also comprise an indicator of a start time of a sleep window 238 associated with the CID 234. The record 230 may further comprise an indicator of a start time of a listening window 242 associated with the CID 234. A number of pending MAC SDUs 246 associated with the CID 234 may also be included in the record 230. The record 230 may include a time stamp 250. The time stamp 250 may indicate a time of writing the record 230, a time of the start of the sleep window, or a time of a transmission of a sleep response message 254 from the BS 204 to the MS 218.

The example table subset 226 shows sleep and listening window start time indicators 238 and 242, respectively, for a system 290 using a 5 ms frame duration. The example sleep window start time indicators 238 and listening window start time indicators 242 in the example table subset 226 correlate to the example window timing snapshot of FIG. 1. Turning back to FIG. 1, it can be seen that an end of each sleep window occurs at a start of the next listening window, as previously described.

In FIG. 2, for example, a first record 258 and a third record 262 of the table subset 226 shows a 14 sec. ((1,562,800−1,560,000)*5 ms) sleep window, a 13 sec. ((1,565,400−1,562,800)*5 ms) listening window, and a 9 sec. ((1,567,200−1,565,400)*5 ms) sleep window, respectively, for a CuD 266 (CID# 100). Thus, an example chain of sleep and listening window start times 270 associated with the CD 266 from the table subset 226 of FIG. 2 may correlate to the sequence of sleep and listening windows 114 of FIG. 1.

The apparatus 200 may also include an SM control module 274 operatively coupled to the SM statistics module 206. The SM control module 274 may be coupled to a transceiver 275 associated with the BS 204. The transceiver 275 may enable communication of sleep window timing information to the MS 218 via an antenna 276 coupled to the transceiver 275. The SM control module 274 may establish the start time of the sleep window and the start time of the listening window. The SM control module 274 may also provide the CID 234, the indicator of the start time of the sleep window 238, the indicator of the start time of the listening window 242, and the number of pending wireless MAC SDUs 246 to the SM statistics module 206.

The apparatus 200 may further include a management information base (MIB) agent 278. The MIB agent 278 may be associated with the SM statistics module 206, and may be capable of responding to a query for one or more of the plurality of SM statistics.

In a further embodiment, a system 290 may include one or more of the apparatus 200, including an SM statistics module 206 as previously described. A display 292 may be operatively coupled to the SM statistics module 206 to display the plurality of SM statistics. The display 292 may comprise a cathode ray tube display or a solid-state display such as a liquid crystal display, a plasma display, or a light-emitting diode display, among others.

The system 290 may also include a simple network management protocol (SNMP) link 294 operatively coupled to the SM statistics module 206. The SNMP link 294 may enable the SM statistics module 206 to respond to an SNMP query. A network management system (NMS) 296 may be coupled to the SNMP link 294. The NMS 296 may query the SM statistics module 206 and may perform one or more statistics operations on the plurality of SM statistics.

Any of the components previously described may be implemented in a number of ways, including embodiments in software. Thus, the window timing diagram 100; the windows 106, 110, 114, 122, 142, 154; connections 118, 126; CIDs 127, 128, 234, 266; frame number 130; boundary 134; offset frame count 138; sleep mode 150; apparatus 200; sleep-mode (SM) statistics module 206; wireless BS 204; MS 218; table 222; records 224, 230, 258, 262; table subset 226; start times 238, 242; number of pending MAC SDUs 246; time stamp 250; sleep response message 254; chain of sleep and listening window start times 270; SM control module 274; transceiver 275; antenna 276; MIB agent 278; system 290; display 292; SNMP link 294; and NMS 296 may all be characterized as "modules" herein.

The modules may include hardware circuitry, single or multi-processor circuits, memory circuits, software program modules and objects, firmware, and combinations thereof, as desired by the architect of the apparatus 200 and the system 290 and as appropriate for particular implementations of various embodiments.

The apparatus and systems of various embodiments may be useful in applications other than capturing sleep-mode statistics for use by power-saving mechanisms to decrease power consumption for MSs. The statistics may also be used by carriers or vendors for performance monitoring and debugging of the power-saving mechanisms, for example. Thus, various embodiments of the invention are not to be so limited. The illustrations of the apparatus 200 and the system 290 are intended to provide a general understanding of the structure of various embodiments. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, multi-core processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 3:
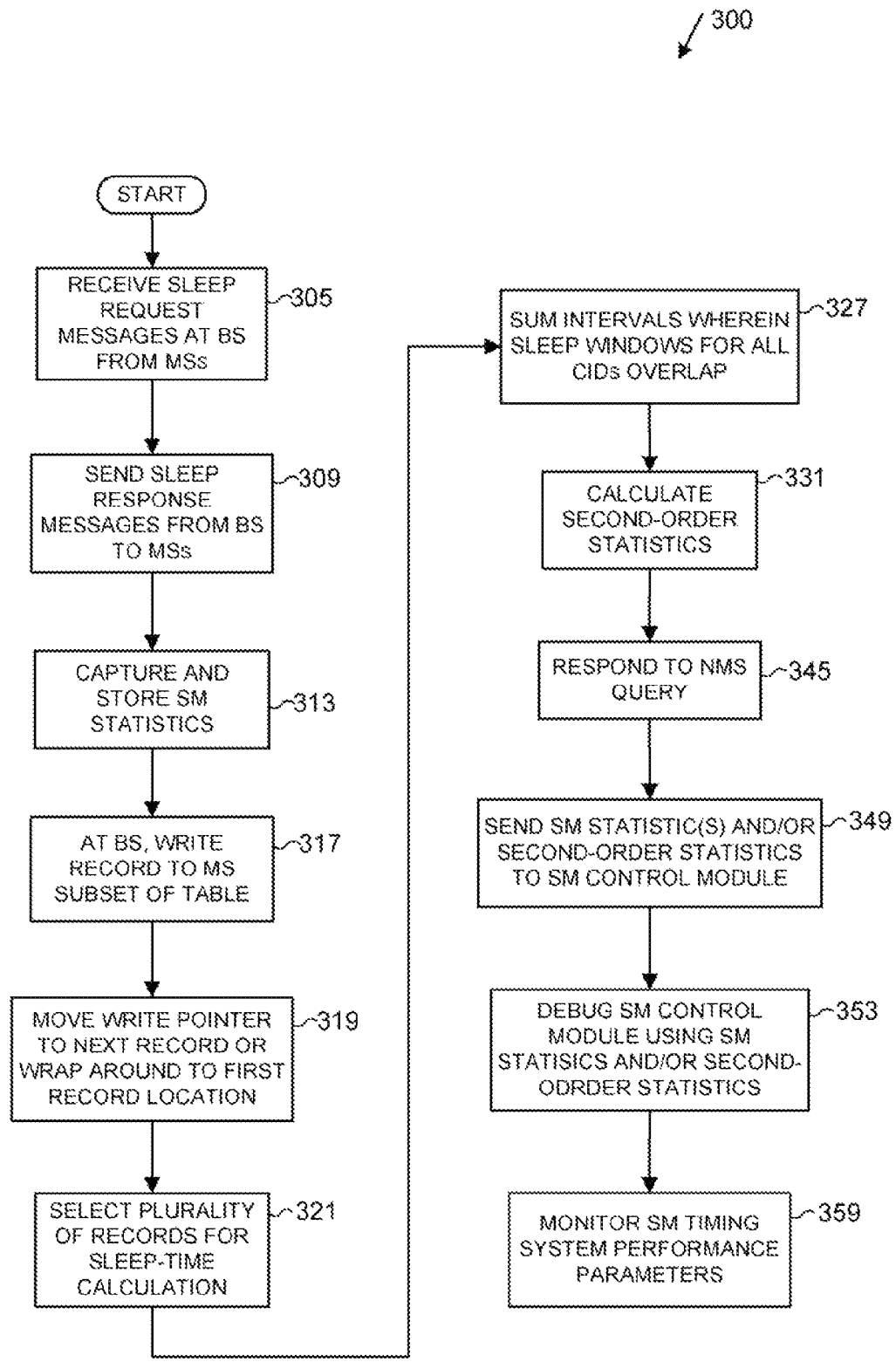
FIG. 3 is a flow diagram illustrating several methods according to various embodiments.

FIG. 3 is a flow diagram illustrating several methods according to various embodiments. A method 300 may operate at a BS to capture and store a plurality of SM statistics generated as a plurality of MSs operate while associated to the BS. The BS may comprise a component of a wireless system conforming to an IEEE 802.16e™ standard, a $3^{rd}$ Generation Partnership Project (3GPP™) standard, or an International Mobile Telecommunications-2000 (IMT-2000) standard, among other wireless systems. Additional information regarding 3GPP™ standards may be found in European Telecommunications Standards Institute (ETSI) Technical Specification TS 101 855 V8.17.0, Digital Cellular Telecommunications System (Phase 2+); Technical Specifications and Technical Reports for a GERAN-based 3GPP™ System (3GPP™ TS 01.01 version 8.17.0 Release 1999) (published June 2005). Additional information regarding the 3GPP™ may be found at http://www.3gpp.org/. Additional information about IMT-2000 standards, and an index to the IMT-2000 standards, may be found at an International Telecommunications Union (ITU) website, at http://www.itu.int/ITU-T/publications/recs.html.

The method 300 may commence a block 305 with receiving sleep request messages from the plurality of MSs at a BS in a wireless network. The method 300 may continue at block 309 with sending sleep response messages from the BS to the plurality of MSs. The sleep response messages may indicate a power-saving class, a sleep start time, a sleep period, a listening start time, or a listening period. These parameters and others may comprise the plurality of SM statistics.

The method 300 may continue at block 313 with capturing and storing the plurality of SM statistics at the BS. The plurality of SM statistics may be related to a negotiation and grant of sleep intervals as the MSs roam in a coverage area of the BS and are associated to the BS, as previously described. The plurality of SM statistics may include one or more sector subsets of SM statistics. A sector subset of the plurality of SM statistics may comprise a subset of statistics from a plurality of MSs roaming in a geographical sector served by the BS.

The plurality of SM statistics may be stored in a table located at the BS. The method 300 may include writing a record to an MS subset of the table, at block 317. The record may contain information from the MS subset of SM statistics, including a CID number associated with the particular MS. The record may also contain one or more of an indicator of a start time of a sleep window associated with the CID, an indicator of a start time of a listening window associated with the CID, a number of pending wireless MAC SDUs associated with the CID, and a time stamp.

The time stamp may comprise a time of writing the record, a time of the start of the sleep window, or a time of a transmission of a sleep response message from the BS to the MS. The indicator of the start time of the sleep window, the indicator of the start time of the listening window, or both may comprise a frame count or a time stamp. For any particular CID, an end time of the sleep window may be substantially coincident with a start time of a next listening window. Likewise, an end time of the listening window may be substantially coincident with a start time of a next sleep window associated with the particular CID.

The method 300 may also include moving a write index pointer to a next record location in the MS subset of the table to prepare to write the next record, at block 319. The next record location may comprise a first record location if the MS subset of the table comprises a wrap-around structure.

The method 300 may further include calculating an accumulated sleep time associated with the MS over a sleep measurement period may be selected from the MS subset of the table, at block 321. A time stamp associated with each of the plurality of records may indicate a record-creation time falling within the sleep measurement period. Intervals within the sleep measurement period may be summed, wherein sleep windows associated with all CIDs recorded during the sleep measurement period overlap in time, at block 327.

Turning back to FIG. 1, for example, a window timing snapshot begins at time=frame 1,560,000. In the interval [1,560,000 to offset=+1,000], a sleep window 142 is associated with a CID 118 but not with a CID 126. The MS was not sleeping during this period, because an MS may not sleep unless sleep windows overlap for all CIDs active during the sleep measurement period. In the interval [+1,000 to +2,800], on the other hand, both the CID 118 and the CID 126 are associated with sleep windows. Assume that the CID 118 and the CID 126 are the only active CIDs associated with the MS during this example sleep measurement period. The interval [1,000 to +2,800] then meets the criteria that sleep-mode state, to accumulate "actual sleep time."

The method 300 may include calculating one or more second-order SM statistics, at block 331. The second-order statistic(s) may include an average percentage of actual sleep time, an average number of connections per time, or an average number of pending MAC SDUs per time, among other calculations performed on the plurality of SM statistics.

The method 300 may also include responding to a query by a network management system (NMS), at block 345. The BS may include selected ones of the plurality of SM statistics, second-order SM statistics(s), or both in response. The method 300 may also include sending selected ones of the plurality of SM statistics or the second-order SM statistic(s) to an SM control module, located perhaps at the BS, at block 349. The statistics may be used by the SM control module to adjust or tune SM control parameters used by the SM control module to control SM timing operation within a geographical area served by the BS.

The method 300 may further include performing debugging operations at the SM control module, the NMS, or both, at block 353. The debugging operation may utilize the plurality of SM statistics, the second-order SM statistic(s), or both. An iteration of the method 300 may conclude at block 359 with monitoring one or more performance parameters associated with the SM timing. The SM control module, the NMS, or some other entity may use selected ones of the plurality of SM statistics and/or the second-order SM statistic(s) to monitor the performance parameter(s).

It may be possible to execute the activities described herein in an order other than the order described. And, various activities described with respect to the methods identified herein may be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 4 below.

Figure 4:
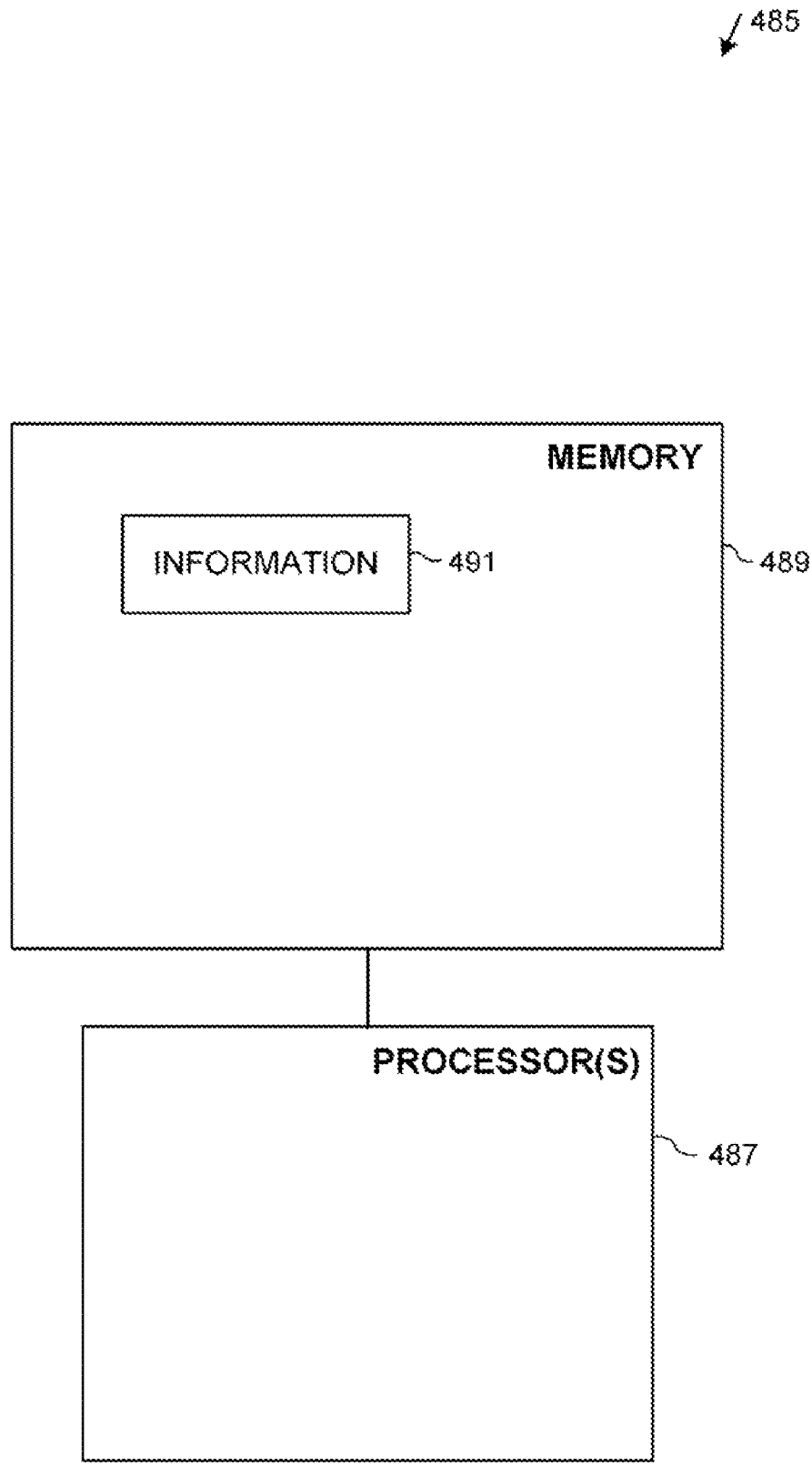
FIG. 4 is a block diagram of an article according to various embodiments.

FIG. 4 is a block diagram of an article 485 according to various embodiments of the invention. Examples of such embodiments may comprise a computer, a memory system, a magnetic or optical disk, some other storage device, or any type of electronic device or system. The article 485 may include one or more processor(s) 487 coupled to a machine-accessible medium such as a memory 489 (e.g., a memory including electrical, optical, or electromagnetic elements). The medium may contain associated information 491 (e.g., the processor(s) 487) performing the activities previously described.

Implementing the apparatus, systems, and methods disclosed herein may capture sleep-mode statistics in a wireless communications system. The statistics may be used by a power-saving mechanism to decrease power consumption for MSs associated with a BS in the wireless communications system. The statistics may also be used by carriers or vendors for performance monitoring and debugging of the power-saving mechanism.

Although the inventive concept may include embodiments described in the exemplary context of an Institute of Electrical and Electronic Engineers (IEEE) standard 802.xx implementation (e.g., 802.11, 802.11a, 802.11b, 802.11e, 802.11g, 802.16, 802.16e™, etc.), the claims are not so limited. Additional information regarding the IEEE 802.11 standard may be found in "ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications" (published 1999; reaffirmed June 2003). Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b. Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11e standard may be found in "IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the present invention may be implemented as part of a wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WMAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope of meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
   a sleep-mode (SM) statistics module at a wireless base station (BS), the SM statistics module to capture and store a plurality of SM statistics associated with a mobile station (MS) in communication with the BS; and
   a memory to contain a data structure associated with the SM statistics module, wherein the data structure is segmented according to a plurality of geographical sectors served by the BS and wherein the data structure is further segmented to store a plurality of records associated with the MS as the MS roams in a geographical sector of the plurality of geographical sectors.

2. The apparatus of claim 1, wherein the data structure comprises at least one of a table, an array, or a list.

3. The apparatus of claim 1, wherein a record associated with the plurality of records comprises a connection identification number (CID) associated with the MS and at least one of an indicator of a start time of a sleep window associated with the CID, an indicator of a start time of a listening window associated with the CID, a number of pending wireless media access control (MAC) service data units (SDUs) associated with the CID, or a time stamp.

4. The apparatus of claim 3, wherein the time stamp comprises at least one of a time of writing the record, the start time of the sleep window, or a time of a transmission of a sleep response message from the BS to the MS.

5. The apparatus of claim 3, further including:
an SM control module operatively coupled to the SM statistics module to establish the start time of the sleep window and the start time of the listening window and to provide at least one of the CID, the indicator of the start time of the sleep window, the indicator of the start time of the listening window, or the number of pending wireless MAC SDUs to the SM statistics module.

6. The apparatus of claim 1, further including:
a management information base (MIB) agent associated with the SM statistics module, wherein the MIB agent is capable of responding to a query for the plurality of SM statistics.

7. A method, including:
at a wireless base station (BS), capturing and storing a plurality of sleep-mode (SM) statistics related to a plurality of mobile stations (MSs) associated to the BS;
at the BS, receiving a sleep request message from a mobile station (MS), the MS being one of the plurality of MSs; and
sending a sleep response message from the BS to the MS, wherein the sleep response message indicates at least one of a power-saving class, a sleep start time, a sleep period, a listening start time, or a listening period.

8. The method of claim 7, wherein the plurality of SM statistics comprises a
sector subset of SM statistics, the sector subset associated with a geographical sector served by the BS.

9. The method of claim 8, wherein the sector subset of SM statistics comprises an MS subset of SM statistics, the MS subset associated with a particular MS served by the BS.

10. A method, including:
at a wireless base station (BS), capturing and storing a plurality of sleep-mode (SM) statistics related to a plurality of mobile stations (MSs) associated to the BS, wherein the plurality of SM statistics comprises a sector subset of SM statistics, the sector subset associated with a geographical sector served by the BS and wherein the sector subset of SM statistics comprises an MS subset of SM statistics, the MS subset associated with a particular MS served by the BS;
at an MS subset of a table associated with the plurality of SM statistics, writing a record comprising a connection identification (CID) number associated with the particular MS and at least one of an indicator of a start time of a sleep window associated with the CID, an indicator of a start time of a listening window associated with the CID, a number of pending wireless media access control (MAC) service data units (SDUs) associated with the CID, or a time stamp; and
moving a write index pointer to a next record location in the MS subset of the table to prepare to write the next record, wherein the next record location comprises a first record location if the MS subset of the table comprises a wrap-around structure.

11. The method of claim 10, wherein the time stamp comprises at least one of a time of writing the record, a time of the start of the sleep window, or a time of a transmission of a sleep response message from the BS to the MS.

12. The method of claim 10, wherein for any record in the table, at least one of the indicator of the start time of the sleep window and the indicator of the start time of the listening window comprises at least one of a frame count or a time stamp.

13. The method of claim 10, wherein for any record, an end time of the sleep window is substantially coincident with a start time of a next listening window.

14. The method of claim 10, wherein for a particular CID, an end time of the listening window is substantially coincident with a start time of a next sleep window associated with the particular CID.

15. The method of claim 10, further including:
calculating an accumulated sleep time associated with the MS over a sleep measurement period by:
selecting a plurality of records from the MS subset of the table, each record of the plurality of records having a time stamp indicating a record-creation time falling within the sleep measurement period; and
summing intervals within the sleep measurement period wherein sleep windows associated with all CIDs recorded during the sleep measurement period overlap in time.

16. The method of claim 15, further including:
calculating a second-order SM statistic including at least one of an average percentage of actual sleep time, an average number of connections per time, or an average number of pending MAC SDUs per time.

17. The method of claim 16, further including:
responding to a query by a network management system (NMS) with at least one of selected ones of the plurality of SM statistics or the second-order SM statistic.

18. The method of claim 17, further including:
sending at least one of selected ones of the plurality of SM statistics or the second-order SM statistic to an SM control module to adjust SM timing as determined by the SM control module.

19. The method of claim 18, further including:
at least one of the SM control module or the NMS, debugging the SM timing using the at least one of selected ones of the plurality of SM statistics or the second-order SM statistic.

20. The method of claim 18, further including:
at least one of the SM control module or the NMS, monitoring a performance parameter associated with the SM timing using at least one of selected ones of the plurality of SM statistics or the second-order SM statistic.

21. An article including a machine-accessible medium having
associated information, wherein the information, when accessed, results in a machine performing:
at a wireless base station (BS), capturing and recording a plurality of sleep-mode (SM) statistics associated with a plurality of mobile stations (MSs);
at an MS subset of a table associated with the plurality of SM statistics, writing a connection identification (CID) number associated with the particular MS and at least one of an indicator of a start time of a sleep window associated with the CID, an indicator of a start time of a listening window associated with the CID, a number of pending wireless media access control (MAC) service data units (SDUs) associated with the CID, or the time stamp of the time of writing the record; and
moving a write index pointer to a next record location in the MS subset of the table to prepare to write the next record, wherein the next record location comprises the first record location if the MS subset of the table comprises a wrap-around structure.

22. The article of claim 21, wherein the wireless base station comprises a component of a wireless system conforming to at least one of an Institute of Electrical and Electronic Engineers (IEEE) 802.16e™ standard, a 3$^{rd}$ Generation Partnership Project (3GPP) standard, or an International Mobile Telecommunications-2000 (IMT-2000) standard.

* * * * *